United States Patent [19]
Nierlich et al.

[11] 4,281,431
[45] Aug. 4, 1981

[54] SHEET CLEANING

[75] Inventors: Jean Nierlich, Antony; Yves Lavoisey, Asnieres, both of France

[73] Assignee: Saint-Gobain Industries, Paris, France

[21] Appl. No.: 54,556

[22] Filed: Jul. 3, 1979

[30] Foreign Application Priority Data

Jul. 5, 1978 [FR] France .................................. 78 19982

[51] Int. Cl.³ .......................... B08B 6/00; B08B 1/02; B08B 5/04
[52] U.S. Cl. .......................................... 15/1.5 R; 15/4; 15/93 R; 15/102; 15/306 A; 15/309; 134/9
[58] Field of Search .............. 15/1.5 R, 40, 77, 93 C, 15/93 R, 102, 306 R, 306 A, 308, 309, 256.5, 3.17, 100, 97 R, 4, 5; 134/1, 6, 9

[56] References Cited
U.S. PATENT DOCUMENTS

| 2,817,862 | 12/1957 | Frazho et al. | 15/102 X |
| 2,832,977 | 5/1958 | Walkup et al. | 15/1.5 R |
| 2,920,987 | 1/1960 | Landry et al. | 15/1.5 R X |
| 3,189,929 | 6/1965 | Koppehele | 15/308 |
| 3,264,673 | 8/1966 | Scott | 15/308 |
| 3,683,445 | 8/1972 | Hagadorn | 15/256.5 |
| 3,745,602 | 7/1973 | Beistle | 15/308 |
| 3,978,546 | 9/1976 | Epina et al. | 15/306 A |

*Primary Examiner*—Edward L. Roberts
*Attorney, Agent, or Firm*—John T. Synnestvedt; Richard D. Weber

[57] ABSTRACT

Methods and apparatus for removing particles from sheet materials, particularly plastic materials that are to be laminated to other materials, are disclosed. The sheet is destaticized, wiped and lightly scraped to dislodge particles from the sheet. The dislodged particles are removed from the sheet by suction. Scrapers with single fixed blades and scrapers with multiple movable blades are used to dislodge particles that are embedded in or adhered to the sheet. The process and apparatus are particularly useful for cleaning sheets of plastic material that are used in laminated glazings having stringent optical requirements.

18 Claims, 13 Drawing Figures

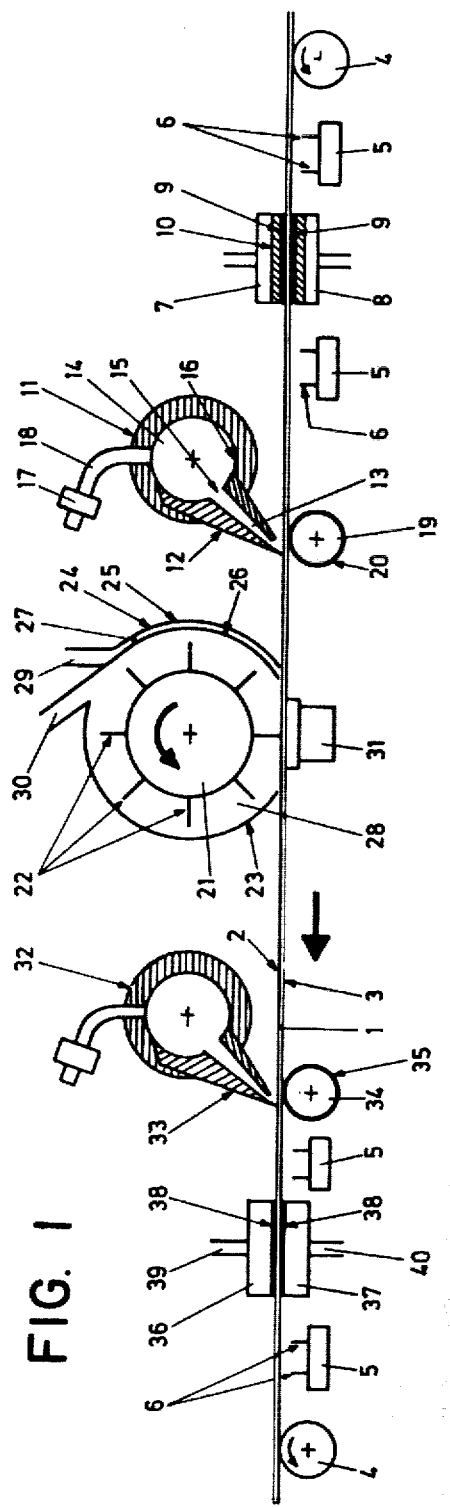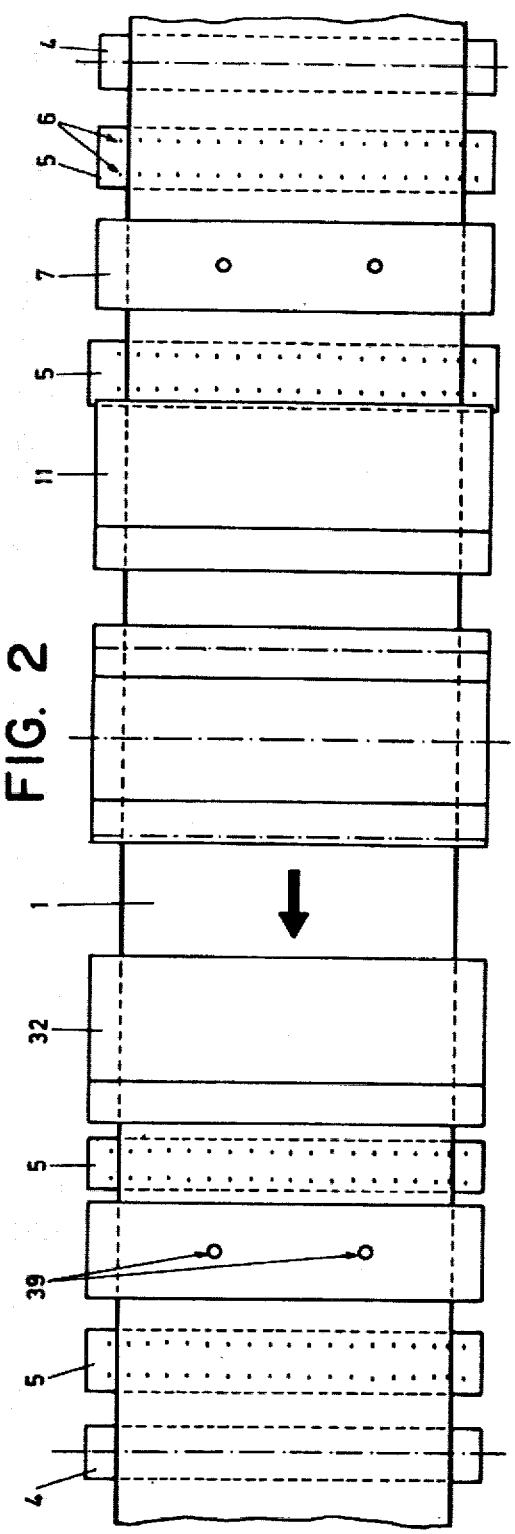

SHEET CLEANING

FIELD OF THE INVENTION

The present invention concerns the removal of particulates from sheets or films, of specific or indeterminate length, particularly transparent or translucid sheets formed of one or several layers of plastic materials, that are utilized in the manufacture of laminated glazings having stringent optical requirements.

BACKGROUND OF THE INVENTION

Laminated glazings are currently in very widespread use in building, transport, optical instrument industries, etc. These laminates are generally formed from several sheets of glass and/or rigid plastic materials in which intercallated sheets are adhered, for example, sheets of polyvinylbutyral. Recently, laminated glazings have appeared comprising, in addition to the elements already described, a sheet of plastic material that possesses good antilaceration and self-healing properties. In automotive glazings of this type, for example, automobile windshields, the antilacerative material is oriented toward the interior of the vehicle so as to protect the occupants of the vehicle from contact with broken glass should the windshield be broken accidentally.

It is important, especially for safety reasons, that automobile windshields have good optical qualities and that they be free of distortions. Thus, particular care must be exercised during their manufacture to avoid defects that can result when particles are present between the self-healing layer and the underlying glass; such particles create optical defects in the form of distortions and/or lenses.

When the sheet of plastic material that is laminated to the glass is polyvinylbutyral or, more generally, a thermoplastic material, the fine specks of dust that might be on the surface of the sheet are not visible because they are embedded in the thermoplastic layer during the assembly of the laminated glass.

On the other hand, when one utilizes sheets having one side formed from a thermoset material, as is the case in the safety window previously mentioned, the grains of dust or other particles are not embedded in the thermoset material when the window is assembled and can provoke the optical defects previously mentioned. Even when the sheet of plastic material has one side formed of a thermoplastic layer, particles do not become completely embedded because the thermoplastic layer is very thin.

It is therefore very important that the sheets of plastic material utilized in the manufacture of a laminated glazing be perfectly clean and free of particles, particularly when the sheet is of one of the types noted above.

It has already been proposed to clean sheets of plastic material by utilizing an apparatus combining the actions of a brush with soft bristles, suction nozzles and antistatic elements that remove the electrical charge on the sheet in the cleaning area. The removal of electrical charge is essential to avoid the deposit of dust or other particles, during the cleaning operation, on the sheet of plastic material, which is generally very susceptible to static electrical charge phenomena.

Such an apparatus is not entirely satisfactory because, in particular, very small particles can pass between the brush bristles. Such apparatus is even less effective for cleaning a sheet that includes a layer that has an adhesive tack. In this latter instance, virtually none of the particles adhered to the tacky layer are eliminated.

SUMMARY OF THE INVENTION

In order to prevent the noted drawbacks, the invention proposes a novel means and method for removing particulates from sheet materials, especially plastic sheet materials. While such means can be employed at different stages in the manufacture of the laminated glass, one generally performs the cleaning just before assembly of the sheet with the other components of the glazing. Cleaning can also take place just after the manufacture of the sheet before storing, if it is not to be utilized immediately. One can also employ the cleaning apparatus at different stages. Thus, advantageously, a first cleaning is performed just after the manufacture of the sheet and before storing, followed by a second cleaning just before assembly of the laminate.

The new cleaning means acts effectively on all types of particles and dust, whatever their nature and dimension, even particles smaller than one micron. The cleaning means provides a sheet free of all visible particles and dust without altering the sheet by the formation of scratches or abrasions that might cause optical defects.

The new process comprises, in combination, the following operations:

at least one of the two major surfaces of the sheet is wiped;

at least one of the two major surfaces of the sheet is scraped;

the particles which have been freed by the wiping and scraping are removed, for example, by vacuum; and any static charge on the sheet is removed.

The wiping of the sides of the sheet eliminates specks of dust or particles which deposit themselves and lightly adhere to it. In particular, it acts effectively on microscopic particles, on very fine hairs, etc.

The scraping has at least two objectives. On the one hand, the scraping elements act as one or several continuous barriers against the particles and dust present on one portion of the sheet, and on the other hand, they loosen the particles that are lightly adhered to the sheet. Further, the scraping action can cut emergent extremities of particles deeply embedded in the sheet. The scraping can be "static" or "dynamic" as will be made clear later.

The vacuuming withdraws the particles and dust wiped and scraped from the surface of the sheet and prevents their deposit on other portions of the sheet. Preferably, the particles are removed as they are being wiped and scraped from the sheet.

The destaticizing of the sheet prevents the attraction of new particles or specks of dust to it. The destaticizing can be achieved, for example, by ionizing the air surrounding the sheet, over the entire cleaning area.

Preferably, in order to eliminate substantially all the particles, several consecutive wipings and scrapings are performed with, preferably, a wiping following the last scraping.

Advantageously, the different cleaning operations are applied to one or both major surfaces of the sheet, depending upon the type of materials forming the exterior layers. They comprise the following sequence:

The surface is wiped and vacuumed simultaneously, then scraped (once or several times) and vacuumed simultaneously, then wiped again. Destaticizing takes place during all of these operations.

The invention also concerns a new apparatus for cleaning sheets, particularly sheets of plastic materials, of a specific or indeterminate length. The new apparatus can be mounted, for example, in an assembly line for laminated glass.

The new apparatus comprises a conveyor for the transport of the sheet to be cleaned, a structure which on both sides of the conveyor supports means for destaticizing the sheet, means for wiping one or both sides of the sheet, means for scraping one or both sides of the sheet, and means for vacuuming the wiped and scraped particles, all these means extending the entire width of the conveyor.

The means for destaticizing the sheet can be antistatic elements that ionize the atmosphere around the sheet, for example, metallic bars equipped with a multiplicity of metallic points, which can be supplied with a high voltage electrical charge or can be grounded, that are placed at distances on the order of a few centimeters above and/or below the sheet. They should also extend the entire width of it.

The means for wiping the sheet on both sides can be elements formed from narrow plates that extend across the sheet, the plates being covered with paper or fabric of a type that does not shed fuzz. For example, a nonwoven paper can be utilized, particularly a paper marketed throughout Europe under the brand name "Vileda". Also, fabrics of synthetic materials can be utilized, either separately or in combination with other types of wiping materials. For example, a polyamide material known as nylon velvet, having the pile oriented in such a way that the filaments of the pile effectively retain the specks of dust and other particles, can be used. Preferably, the plates are connected through conduits to a source of suction that aids in the retention of the particles on the paper or in the pile of the fabric, thus avoiding redeposit of the particles on another portion of the sheet.

The means for scraping the sheet, above and/or below the path of the sheet, can comprise one or several units equipped with at least one rigid or semirigid blade that is resistant to wear. The particular type of blade used is governed by the materials that form the surfaces of the sheet and the purpose for which the sheet is to be used. For example, in order to scrape a surface formed essentially of a thermoplastic material, stainless steel blades from a few hundredths to a few tenths of a millimeter thick are used. These same stainless steel blades are utilized for scraping the other surface, that may be formed of a thermoplastic or thermoset material, of a sheet for which exceptional optical properties are not important. On the other hand, if optical properties are important and/or if the sheet includes a layer formed of a relatively nonyielding thermoset material, blades that do not have an abrasive action on the material and that do not scratch it are used.

Preferably, the blades are placed parallel to the sheet, perpendicularly to the direction of movement of the sheet on the conveyor, with the tips of the blades being disposed somewhat below, in the case of the top surface of the sheet, or somewhat above, in the case of the bottom surface of the sheet, the plane of support of the sheet on the conveyor.

Advantageously, in order to improve the scraping, the blades are placed immediately next to rollers that are covered with a paper or a velvet-type fabric, in such a way that the sheet passes between the rollers and the blades. The blades scrape the sheet and retain the particles that were laying on it. Advantageously, the scraping means includes a section device extending along the length of the blades that removes the particles dislodged from the sheet and retained by the blades. The suction device is disposed near the tip of the blades and on the upstream side of the blades relative to the direction of the movement of the sheet.

Preferably, in order to obtain good scraping at all points on the sheet, the blades are mounted at a slight angle in relation to the vertical and away from the direction of movement of the sheet. In this orientation, the blades can yield more easily and thus can follow fluctuations in the level of the scraped surface which may result from lack of uniform thickness of the sheet or from varying tension of the sheet.

Fixed sets of blades provide a static scraping and retain the particles that are deposited on the surface of the sheet. Also, they can eliminate certain particles lightly embedded in the exterior layers of the sheet. In order to improve the removal of embedded particles, it is desirable to have a repeated stroking of the blades on these particles and to utilize scraping members comprising one or several moving blades. These members provide a dynamic scraping. Thus, advantageously, the cleaning apparatus comprises one or several rotatable drums having their axis of rotation parallel to the sheet, each drum having a plurality of blades mounted on its periphery.

The distance between the drum or drums and the sheet is arranged so that the blades come in contact with it, either to a greater or lesser degree, depending on the type of layer being scraped. The use of such movable blades together with the fixed set of blades greatly improves the efficiency of the cleaning, eliminating the surface particles and also those which are partially embedded in the surface layer. Because of the repeated action of the blades, the elimination of the embedded particles is achieved without the blades exerting too great a pressure on the sheet, that would be likely to damage it, for example, by scratching the surface.

Advantageously, the apparatus comprises at least one element with a fixed blade and at least one element with a movable blade disposed on one or both sides of the sheet.

In another form of the apparatus, the scraper with movable blades can comprise several parallel reciprocating blades, mounted perpendicularly to the direction of movement of the sheet. The scraper with reciprocating blades acts effectively on the particles partially embedded in an exterior layer of the sheet.

In order to improve the cleaning efficiency of the apparatus and to maintain it in its state of cleanliness, it is particularly worthwhile to place the apparatus in an enclosed area that is supplied with filtered air, for example, an enclosure having walls of textile glass fiber capable of preventing the ingress of particles that are greater than about 0.3 $\mu$m in size. Furthermore, it is advantageous to establish a positive pressure in the enclosure, for example, on the order of a few millimeters of mercury, so as to prevent the admission of unfiltered air into the enclosure. The isolation of the apparatus from dust or other polluting agents can be further improved by placing it in an enclosure which itself is situated in a filtered area.

The sheet cleaning is generally achieved in an atmosphere regulated to about 60% relative humidity and at a room temperature on the order of 20° C. to 25° C. Too high a humidity causes oxidation of the parts of the apparatus. On the other hand, too dry an atmosphere tends to increase the static electric charge on the sheet, thereby attracting a greater number of particles to the sheet.

During cleaning, the temperature of the sheet is maintained at approximately 20° C. to 40° C. If the temperature is too low, the mechanical properties may be adversely affected so that the sheet becomes more sensitive with regard to the movable elements of the apparatus, for example, making the sheet easily scratched. If the temperature of the sheet is higher and it has an outside layer comprising a thermoplastic material having properties of adhesion at elevated temperatures, then the thermoplastic side will more strongly retain dust and other particles.

Other advantages and attributes of the invention will appear in the following description of an embodiment of the apparatus.

BRIEF DESCRIPTION OF THE DRAWINGS

FIG. 1 is an elevational view of an arrangement of the cleaning apparatus for the sheet of plastic material.

FIG. 2 is a plan view of the apparatus.

DESCRIPTION OF THE PREFERRED EMBODIMENT

Figure 3:
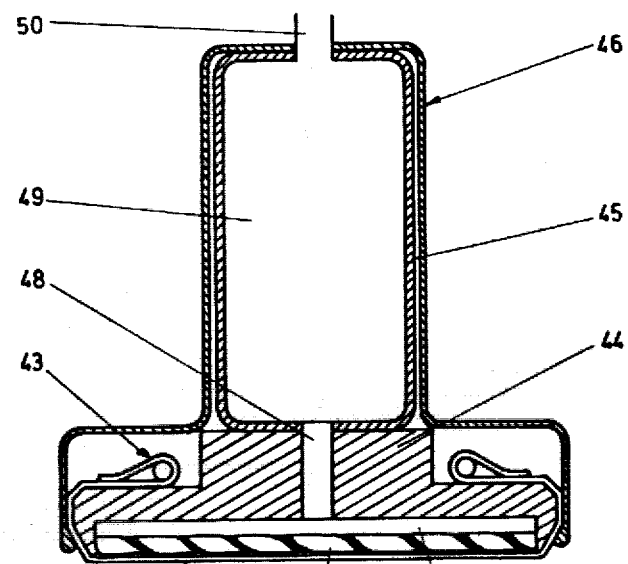
FIGS. 3 and 4 show an element utilized for wiping the sheet.

FIGS. 1 and 2 are diagrams of apparatus used for cleaning a plastic sheet 1 of indeterminate length and having an upper side 2 comprising a thermoplastic material, for example, a thermoplastic polyurethane that has adhesive properties at higher temperatures but that is not adhesive at room temperature, and a lower side 3 comprising a thermoset material, for example, a thermoset polyurethane having self-healing and antilacerative properties (for example, the polyurethane described in French Pat. No. 2,251,608). Such a sheet is utilized, for example, as the interior surface layer of a vehicle windshield and it is described in Belgian Pat. No. 856,398.

In this example, the apparatus is placed at the beginning of an assembly line for laminated glazings, in an area isolated from all sources of dust and other particles and in which the atmosphere is maintained at a temperature of about 20° C. and a relative humidity of about 60%. In order to do this, walls of glass fiber textile material capable of filtering particles with dimensions greater than 0.3 μm enclose the apparatus.

The sheet is placed on a conveyor comprising rollers 4 that are smoth or that are covered with a particle-retaining material, such as the nylon velvet fabric previously mentioned, in order to avoid any mechanical alteration of the thermoset surface 3 of the sheet.

The sheet comes from, for example, a roll, the form in which it has been stored from the time of its manufacture to the time of its utilization.

Under the sheet and at a distance of a few centimeters, the apparatus includes a first antistatic metallic bar 5 equipped with a significant number (on the order of about one hundred) of metal points 6. The bar is supplied with an electrical current of several thousand volts. For example, one can utilize antistatic bars marketed by the French company Simco under the designation P-SH, the latter being supplied with 8,000 volts DC. Beyond the antistatic bar, two wiping elements 7 and 8 are situated on both sides of the sheet 1 and extend across its entire width. The surfaces of the elements adjacent the sheet are covered with a wiping material, for example, a paper marketed under the brand name "Vileda Kuch" (type 315 033) by the French company Julliard. The Vileda paper covers a layer of supple material 10 that preferably is porous so that the vacuum can be drawn across it. The elements 7 and 8 will be described in greater detail hereafter. The Vileda paper retains very fine particles and dust, with dimensions often smaller than one micron, fine hairs, etc.

Beyond the elements 7 and 8, the apparatus includes a second antistatic bar 5, analogous to the first, placed a short distance from the sheet and on one or both sides of it.

Further, the apparatus comprises a first fixed scraper assembly. This assembly includes a hollow cylinder 11 on which a metallic blade 12 is mounted. The blade 12 is preferably of stainless steel, about 0.015 mm thick, and extends the entire width of the sheet. The hollow cylinder 11 also has a suction nozzle with a narrow slot 13, with a length equal to that of the blade and situated upstream from it.

The slot 13 opens into the interior 14 of the cylinder 11 at a level 15 above the lowest point 16 of the internal diameter. The interior 14 is connected to a source of vacuum that can be common to all the vacuuming elements. The suction generally used is on the order of 120 mm of mercury. The cylinder 11 is rotatably mounted on bearings so that the blade is supported on the sheet. The amount of force imposed on the sheet by the blade can be regulated by counterweights 17 that are adjustably positionable on the rods 18. This force is preferably on the order of one of two newtons per linear centimeter. The blade is inclined slightly toward the upstream direction in order to be more yieldable so as to accomodate fluctuations in the thickness of the sheet. The assembly is situated above and preferably, for reasons to be cited later, slightly beyond the axis of roller 19, that can be one of the conveyor rollers and that, advantageously, in order to clean the thermoset side, is covered with a cleaning fabric 20, for example, nylon velvet, as will be specified later on.

Beyond the fixed-blade assembly, the apparatus comprises a cylindrical drum 21 on which a multiplicity of metallic blades 22 is mounted, for example, about ten flexible blades of stainless steel. During operation, the drum is rotated. It is mounted so that the blades come in contact with the upper surface of the sheet and press on it with a force of about one to two newtons per linear centimeter. The drum is surrounded by a sheet metal housing 23 of which part 24 is formed from two sheets 25 and 26 in such a way as to form a narrow channel 27. The channel 27, as well as the cavity 28 of the housing, are connected by ducts 29 and 30 to a source of vacuum. The drum is mounted above a floating sheet supporting member 31.

Beyond the drum, the apparatus comprises a second fixed-blade set which is substantially the same as the first and has a hollow cylinder on which is mounted a blade 33. Preferably, the blade 33 is thinner, for example, about 0.005 mm, than blade 12. In this preferred form, the first assembly, with a more rigid fixed blade, has the role of eliminating or at least loosening particles lightly embedded in the thermoplastic layer, while the second assembly with a less rigid blade in order to obtain a finer scraping, has a finishing function. The second fixed-blade set is also positioned slightly offset with respect to roller 34 that can be covered with nylon velvet-type material 35.

The apparatus further comprises a third antistatic bar 5 followed by a second set of wiping elements comprising plates 36 and 37 that extend on both sides of the sheet, across its entire width, and that are covered with a particle-retaining fabric 38, for example, of a nylon velvet-type material, facing the sheet. For example, one can utilize the fabric sold under the brand name "Nylon Velvet," Quality 66008, Black 450, by the German company Niedick A.G. Suction conduits 39 and 40 are mounted to the backs of the plates 36 and 37. The filaments forming the pile of the fabric are oriented in the upstream direction and retain any particles and dust that escaped the preceding elements of the apparatus. The filaments of the nylon velvet can enter any irregularities in the surface of the sheet. The role of the nylon velvet is particularly significant in cleaning a continuous sheet that is formed by a succession of individual sheets joined to one another by transverse adhesive strips. In this form, the sheet has a raised edge at each adhesive strip. Dust and other particles become lodged in these edges, especially during their passing under the scraping blades. The filaments of the nylon velvet, which follow the fluctuations in the thickness of the sheet, dislodge these particles.

Further, the apparatus includes another antistatic means 5 analagous to the preceding ones, positioned downstream of the plates 36 and 37. It has been found desirable to position such means immediately adjacent and downstream of elements of the apparatus that rub the sheet and are therefore likely to impart a static charge to it. It is usually important that at least one antistatic means be placed beyond the last of these rubbing elements.

All of the cleaning elements as well as the antistatic bars extend the entire width of the apparatus and are mounted on a support structure (not shown).

FIG. 3 shows one of the wiping elements 7, 8, 36 or 37. This element comprises a plate 41 covered by wiping paper or a wiping fabric 42 of the types previously described. The paper or fabric is held taut under the plate by rods 43 mounted on plate support 44. The plate support is affixed to a hollow section 45, the two extremities of which are mounted on the frame of the apparatus. A housing 46 of sheet metal encloses the plate support 44 and the hollow section 45. The active surface of paper or fabric can have a width on the order of about 20 cm.

Figure 4:
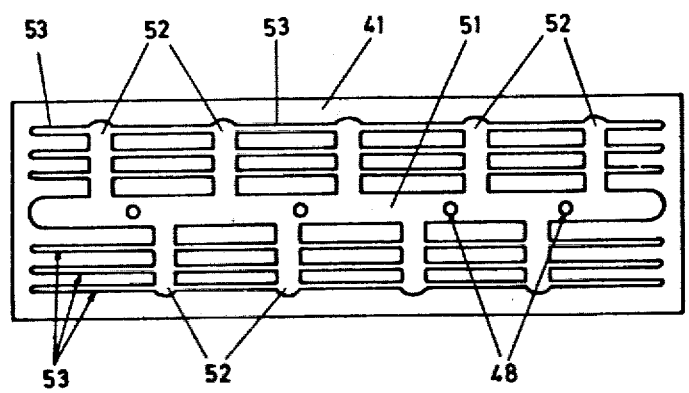

It is desirable that the wiping element include a suction feature, in which a vacuum is drawn across the paper or on the wiping fabric 42. For this reason, the plate 41 can be of a porous material, such as a foam. In the form illustrated, a space 47 is located between the plate 41 and the plate support 44, the space 47 being in fluid communication, by ducts 48, with the interior 49 of the hollow section 45, the interior 49 being connected to a source of vacuum through the ducts 50. A plate of a non-porous material that is pierced by holes distributed on the entire surface of contact of the fabric or paper can also be used. Moreover, as is shown in FIG. 4, a plate 41 of rubber that has numerous channels on its surface for drawing the vacuum across the fabric or paper can also be used. FIG. 4 shows a plan view of the surface of plate 41 to be covered with the paper or fabric. This surface includes a main channel 51 connected by ducts 48 to a vacuum source. On both sides of the main channel, secondary channels 52 extend to more narrow tertiary channels 53. In this way, the suction can be drawn across substantially the entire surface of the plate and the lower pressure created is appreciably constant on the entire active surface of the plate.

Figure 5:
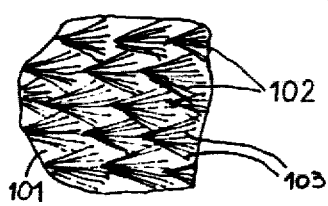
FIGS. 5 and 6 represent a piece of nylon velvet fabric with an oriented pile.
Figure 6:
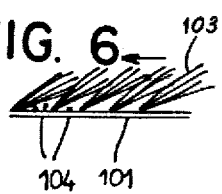

FIGS. 5 and 6 represent, in a view from above and one from the side respectively, a sample of the nylon velvet fabric that is preferable to use. This nylon velvet is formed from a woven base 101 on which very numerous small tufts 102 are affixed, these tufts each comprising about thirty very fine filaments 103 two to three millimeters long. These tufts are placed in zig-zag positioning and at distances on the order of about two millimeters from one another. The filaments are essentially inclined in the same direction. The fabric is mounted on the wiping elements so that the filaments are oriented in a direction opposite to that of the direction of movement of the sheet, as is represented by the arrow in FIG. 6. In this manner, during the cleaning operation, the particles and dust 104 present on the sheet are retained by the filaments and held in the tufts.

Figure 7:
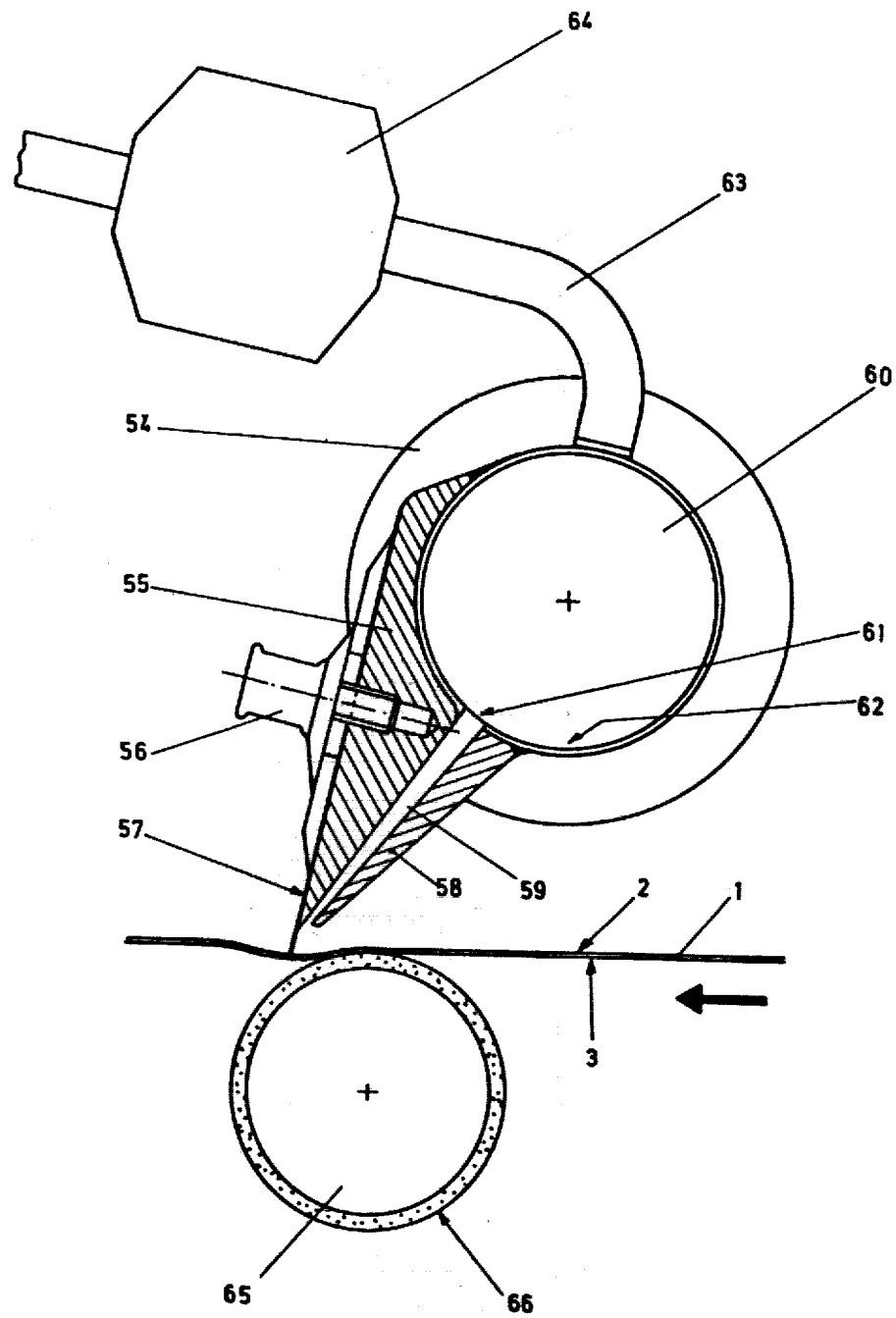
FIGS. 7, 8 and 9 show a scraper element with a fixed blade.
Figure 8:
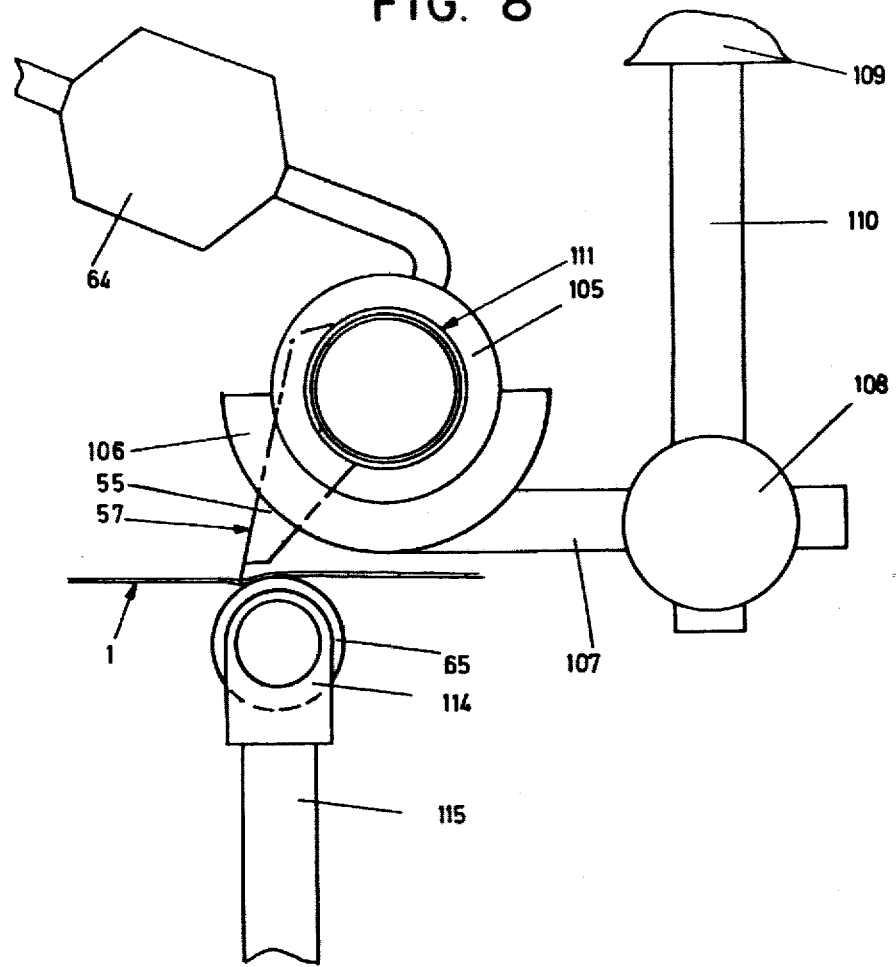
Figure 9:
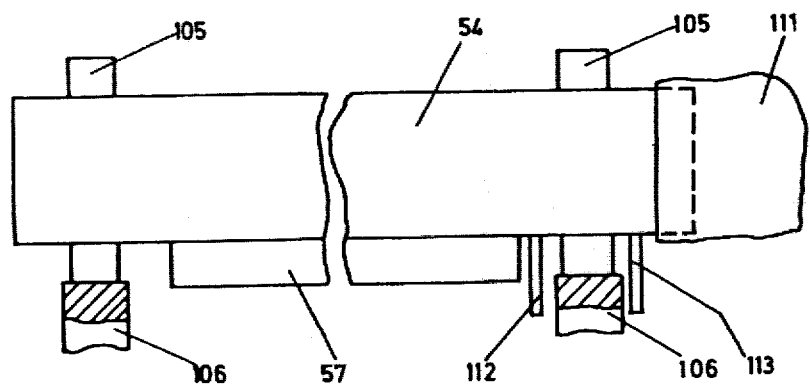

FIGS. 7, 8 and 9 represent a scraping element with a fixed blade utilized for the scraping of the surface of the sheet. This element is shown in FIGS. 7 and 8 in the scraping position above the sheet 1; FIG. 9 is a transverse view. The element comprises a hollow cylinder 54 that extends the entire width of the sheet and that, at each of its extremities, by the intermediary of needle bearings 105, for example, rests on a cradle 106. The cradle 106 is connected by a substantially horizontal shaft 107 to a block 108 which is connected to an upper frame of the support structure 109 by a substantially vertical shaft 110. The shafts 107 and 110 are adjustably received in the block 108 and this system allows for adjustment of the position of the scraper. A blade support 55 is mounted on cylinder 54. This support maintains, with the aid of screw 56, for example, a blade 57 in a position slightly inclined in relation to the vertical. The flat-sided blade is of uniform cross section and can have a thickness on the order of a few hundredths to a few tenths of a millimeter, the thickness depending upon the position of the scraper in the apparatus and also depending on the material of which it is made. Adjacent the blade support 55 is a rib 58 which is mounted on cylinder 54 and forms, with the blade support 55, a slot 59 that is in fluid communication with the interior 60 of the cylinder at a point 61 higher than the low point 62 of the internal diameter so that the vacuumed dust or particles do not fall back onto the sheet. The vacuuming can be achieved through one of the ends of the cylinder 54 by means of a conduit 111 connected to a vacuum source. The cylinder is surmounted by one or several shafts 63 on which one or several adjustable counterweights 64 can be placed. These counterweights allow for the precise regulation of the force imposed on the sheet by the blade, a force that can be on the order of a few newtons per linear centimeter. Two flanges 112 and 113 affixed to the cylinder 54 maintain the scraper in its transverse position.

In the scraping position, the blade is positioned slightly toward the downstream side of a roller 65 mounted by means of bearing 114 on a shaft 115 that is fixed to a lower frame of the apparatus. The positioning of the working edge of the blade downstream of the axis of rotation of the roller yields several advantages as compared to placing the blade perpendicular to the roller. On the one hand, the yieldability of the blade is increased with respect to the sheet to be cleaned. On the other hand, the chance of abrading, cutting, or at least marking the sheet during a change in speed or tension of the sheet is diminished. Roller 65 can be covered with a wiping material 66 such as nylon velvet. It then has a double role—in addition to supporting the sheet, it simultaneously cleans the lower side 3 of the sheet.

The scraper assembly of FIGS. 7-9 can be utilized for the scraping of the thermoset side of the sheet. However, it is desirable to substitute a softer blade, for example, one of synthetic polymeric material, for the metallic blade. This blade of synthetic material does not scratch or damage the thermoset polyurethane previously mentioned.

Figure 10:
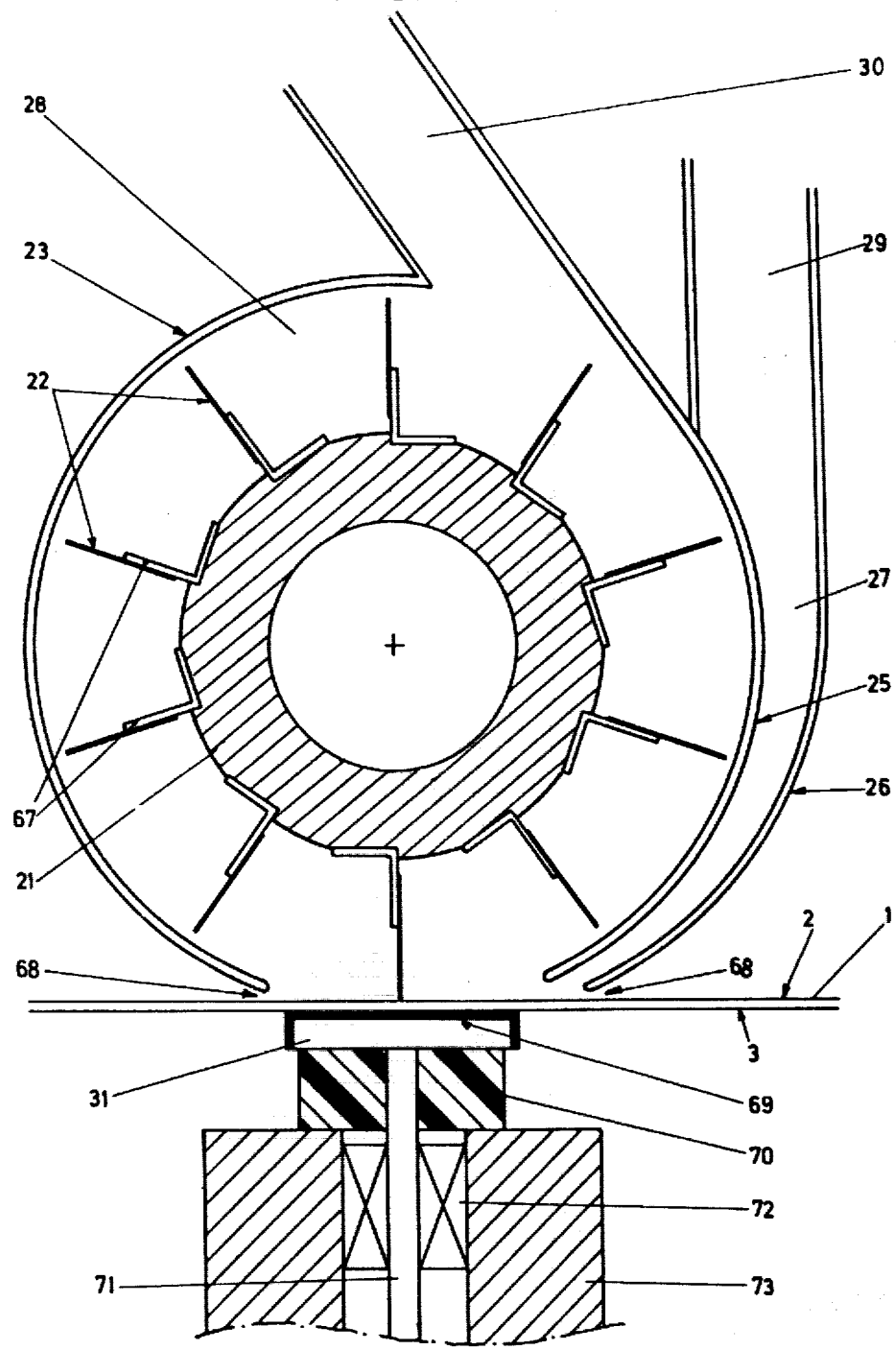
FIGS. 10 and 11 show a rotary scraper.
Figure 11:
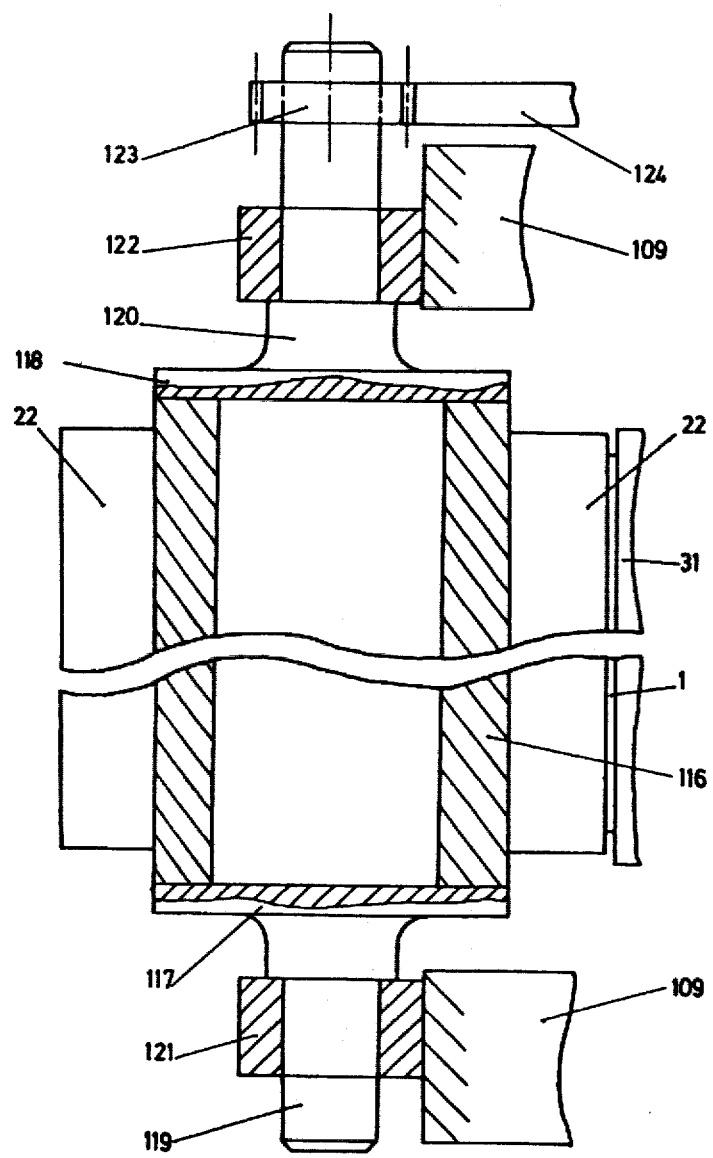

FIGS. 10 and 11 illustrate a dynamic scraper. FIG. 10 shows the scraper in operative position above sheet 1. This scraper comprises a drum 21 that extends the entire width of the apparatus. Brackets 67 affixed by screws to the periphery of the drum carry the blades 22, which blades are preferably of stainless steel that is a few tenths of a millimeter thick. In order to avoid the projection of particles on the regions adjacent the scraped area of the sheet, and also for safety reasons, a housing 23 of sheet metal encloses the drum. Two sheet metal walls 25 and 26 are included in the housing so as to create a slot-like channel 27 along the entire width of the apparatus. The suction ducts 29 and 30 connect channel 27 and interior 28 of the housing to a source of suction. In its working position, the lower extremities 68 of the housing are situated very close to the sheet. The drum is mounted above floating horizontal table 31 made of stainless steel and covered with wiping material 69, for example, nylon velvet. Table 31 rests on cushioning element 70 made, for example, of rubber, and is mounted on one or several vertical pins 71 that are slidably received in bearings 72 in the frame 73 of the apparatus.

The rotary drum element can be equipped with about ten blades, for example. The distance from the axis of rotation of the drum to the working edges of the blades is on the order of 20 cm.

The drum is driven in a rotary motion, usually opposite to the direction of movement of the sheet to be scraped. The rotational speed can vary according to the scraping to be achieved. For example, the drum can be turned at a speed of ten revolutions per second. A self-vacuum, that in certain cases can interfere with the applied suction, is created at higher speeds.

The means for driving the drum can be manual or automatic. An electric motor, for example, can be utilized.

FIG. 11 illustrates, in axial cross section, the rotary drum scraper. The drum 21 is formed from a hollow cylindrical part 116 that carries brackets supporting the metallic blades 22. Two plates 117 and 118 are mounted on the ends of the cylindrical part 16, each plate carrying a half-shaft 119 and 120. These two half-shafts are supported by two bearings 121 and 122 that are mounted on the frame 109 of the apparatus. A pinion 123 mounted on the half-shaft 120 engages a driven gear 124 which imparts rotation to the drum and blades through the pinion 123.

The mounting system for the rotary drum can also include cushioning.

Figure 12:
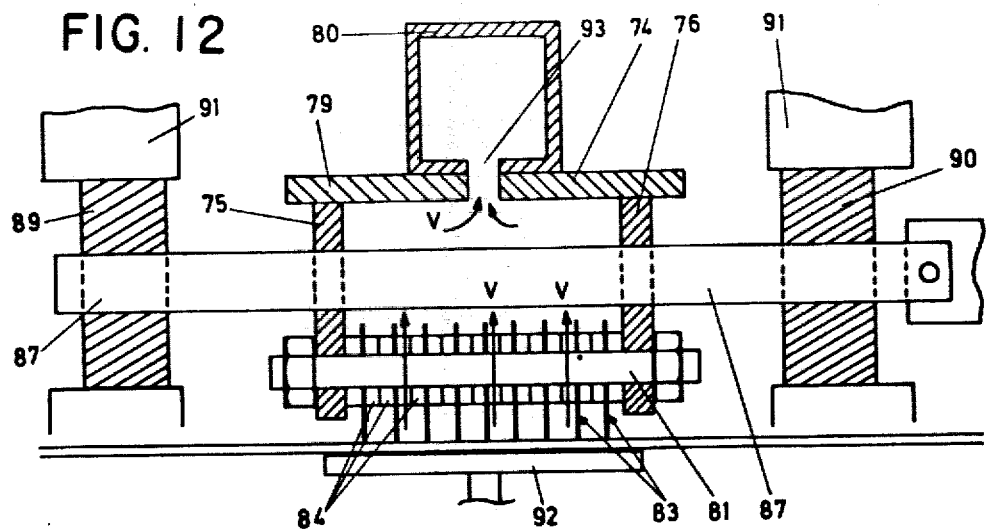
FIGS. 12 and 13 show a scraper element with reciprocating blades.
Figure 13:
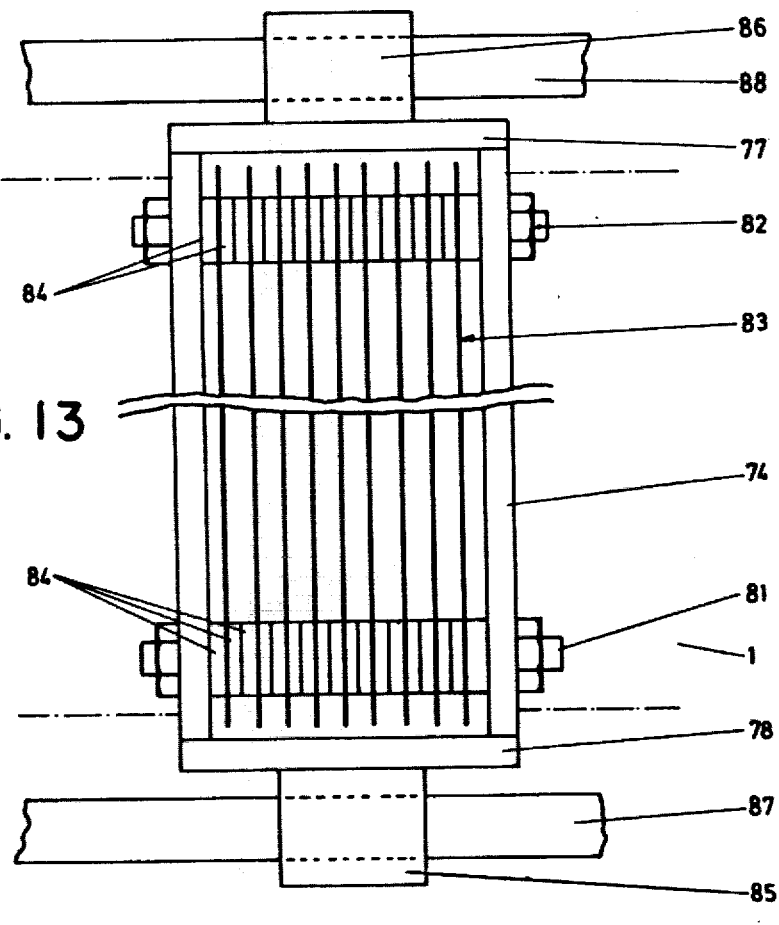

FIGS. 12 and 13 show a reciprocating type of scraper that can be used in place of the rotary scraper just described. This element is reciprocated in a path aligned with the direction of movement of the sheet. The scraper comprises a body 74 extending the entire width of the apparatus, formed by four vertical sides 75, 76, 77 and 78 surmounted by a plate 79. A hollow conduit 80 is mounted on plate 79; the conduit 80 is connected to a vacuum source. Two substantially horizontal support pins 81 and 82 extend between the side walls 75 and 76. The pins 81 and 82 support the parallel metallic blades 83 that are separated from one another by washers 84 in order to space them about 5 mm apart. The blades 83 extend the entire width of the element. They are preferably of stainless steel, a few hundredths of a millimeter thick. The body 74 is supported by means of flanges 85 and 86 that carry horizontal shafts 87 and 88. Opposed ends of the shafts 87 and 88 are slidably received in bearings 89 and 90 that are mounted on the frame 91 of the apparatus and that guide the body for back-and-forth movement. The shafts 87 and 88 are, furthermore, connected to a driving means that produces the reciprocating movement. The drive means can comprise, for example, an electric motor driving an eccentric drive system with a crank arm, for converting rotary motion to a reciprocating motion.

The reciprocating scraper is preferably mounted above a floating horizontal table of the type already described in connection with FIG. 10.

Referring to FIG. 12, during the cleaning of sheet 1, the scraper is reciprocated at a frequency on the order of ten cycles per second. The loosened particles are drawn by vacuum between the blades, as shown by the arrows V through the openings 94 between the base 79 and the hollow conduit 80.

The efficiency of the scraper with reciprocating blades is comparable to that of the rotary drum with blades. Nevertheless, because the drum scrapes in one direction, there is less rick of abrading the sheet than there is with the reciprocating blades that undergo a reversal of their inclination during each of their back-and-forth movements.

Furthermore, the use of the rotatable drum has the advantage of being less likely to produce vibrations that are transmitted to other elements of the apparatus.

In the example described above, the apparatus does not have scaping elements for the underside of the sheet; however, it should be realized that such means can be included, provided that they do not alter the surface of the material which can be, for example, a thermoset polyurethane susceptible to scratching.

Other apparatus in which the order of the cleaning elements and/or their number are modified are within the scope of the invention. For example, the rotary drum with blades can be placed upstream of the fixed-blade scraper and even upstream of the wiping elements. Furthermore, a fixed-blade scraper could be placed downstream of a last wiping element that is provided with a nonshedding fabric, such as the nylon velvet type.

In another form of the apparatus, both a rotating scraper and a reciprocating scraper can be used.

The apparatus of the invention may be used for cleaning sheets of differing sizes. It is effective when the sheet is moving at a speed on the order of several meters per minute. In this case, a surface of the sheet corresponding approximately to the shape of a laminated windshield and that has about sixty particles on its surface before being cleaned, is found, after use of the apparatus, to be almost completely free of visible particles.

What we claim is:

1. Apparatus for removing particles from a sheet, comprising:
   a conveyor for transporting the sheet;
   means adjacent said conveyor for removing static charge from the sheet as it passes along said conveyor;
   means adjacent said conveyor for wiping at least one side of the sheet as it passes along said conveyor;
   means adjacent said conveyor for scraping at least one side of the sheet as it passes along said conveyor; and
   means associated with said wiping and scraping means for removing the wiped and scraped particles from the sheet.

2. Apparatus according to claim 1 wherein the means for wiping the sheet includes a nonwoven paper.

3. Apparatus according to claim 1 wherein the means for wiping the sheet comprises a fabric which does not shed fuzz.

4. Apparatus according to claim 3 wherein the fabric is a velvet-like material with an oriented pile.

5. Apparatus according to claim 4 wherein the velvet is mounted so that the pile extends in a direction opposite to the direction of movement of the sheet.

6. Apparatus according to claim 1 wherein the means for wipng comprises a first wiping element including nonwoven paper and a second wiping element including a velvet-like fabric, the first element being positioned upstream of the second element.

7. Apparatus according to claim 1 wherein the means for scraping comprises a fixed blade.

8. Apparatus according to claim 1 wherein the means for scraping comprises at least one movable blade.

9. Apparatus according to claim 8 wherein the scraping means comprises a rotary drum having a plurality of blades on its periphery.

10. Apparatus according to claim 9 wherein the blades are of stainless steel and have a constant cross section.

11. Apparatus according to claim 8 wherein the scraping means comprises at least one reciprocating element equipped with at least one blade.

12. Apparatus according to claim 1 wherein said means for removing the scraped particles includes a source of suction connected to the scraping means for removing freed particles from the sheet.

13. Apparatus according to claim 12 wherein the means for scraping includes a fixed blade and a suction nozzle in fluid communication with a suction conduit at a point above the lowest part of the conduit so that particles do not fall back onto the scraped sheet.

14. Apparatus according to claim 1 wherein the means for wiping includes a suction nozzle for removing the freed particles from the sheet.

15. Apparatus according to claim 1 wherein on at least one side of the sheet, a wiping means is located at an upstream end of the apparatus, the means for scraping is located downstream of the wiping means, a second wiping means is positioned downstream of the scraping means, the second wiping means including a wiping fabric, and a means for removing the static charge on the sheet is positioned downstream of the second wiping means.

16. Apparatus according to claim 15 wherein the scraping means comprise a first element with a fixed blade, an element with movable blades, and a second element with a fixed blade that is more flexible than the blade of the first element.

17. Apparatus according to claim 16 wherein the fixed blades are inclined in the upstream direction with respect to the direction of movement of the sheet.

18. Apparatus for removing particulates from a surface of a sheet, comprising:
   means for supporting the sheet;
   scraper means comprising a rotatable drum, means for mounting the rotatable drum for rotation, a plurality of metal blades mounted on the rotatable drum to present working edges extending outwardly of the drum transversely of the sheet to extend across the sheet with the working edges of the blades engaging a surface of the sheet; and
   suction means operably disposed adjacent the working edges of the blades for removing particles scraped from the sheet by the blades.

* * * * *